United States Patent
Paulraj et al.

(10) Patent No.: US 12,032,969 B2
(45) Date of Patent: Jul. 9, 2024

(54) MANAGEMENT CONTROLLER AS BIOS

(71) Applicant: Dell Products L.P., Round Rock, TX (US)

(72) Inventors: Deepaganesh Paulraj, Bangalore (IN); Mahesh Babu Ramaiah, Bangalore (IN); Akkiah Choudary Maddukuri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 87 days.

(21) Appl. No.: 17/730,693

(22) Filed: Apr. 27, 2022

(65) Prior Publication Data

US 2023/0350694 A1   Nov. 2, 2023

(51) Int. Cl.
| | |
|---|---|
| *G06F 9/4401* | (2018.01) |
| *G06F 9/54* | (2006.01) |
| *G06F 11/30* | (2006.01) |
| *H04L 41/0853* | (2022.01) |
| *H04L 41/0895* | (2022.01) |

(52) U.S. Cl.
CPC ............ *G06F 9/4416* (2013.01); *G06F 9/547* (2013.01); *G06F 11/3051* (2013.01); *H04L 41/0853* (2013.01); *H04L 41/0895* (2022.05)

(58) Field of Classification Search
CPC ...... G06F 9/4416; G06F 9/5077; G06F 9/547; G06F 11/3051; G06F 15/177; G06F 15/7871; G06F 9/4405; G06F 9/4411; H04L 41/08; H04L 41/0853; H04L 41/0866; H04L 41/0869; H04L 41/0895
See application file for complete search history.

(56) References Cited

U.S. PATENT DOCUMENTS

| | | | |
|---|---|---|---|
| 11,625,338 B1* | 4/2023 | Riley | G06F 21/82 |
| | | | 710/19 |
| 2020/0203898 A1* | 6/2020 | Butcher | H04L 49/15 |
| 2020/0278892 A1* | 9/2020 | Nainar | H04L 67/10 |
| 2021/0240497 A1* | 8/2021 | Thulasi | G06F 9/546 |
| 2022/0092188 A1* | 3/2022 | Khatri | G06F 21/572 |
| 2022/0206964 A1* | 6/2022 | Kim | G06F 13/107 |
| 2023/0004508 A1* | 1/2023 | Liu | G06F 9/4406 |
| 2023/0109231 A1* | 4/2023 | Adogla | H04L 41/40 |
| | | | 709/223 |
| 2023/0229480 A1* | 7/2023 | Warkentin | G06F 8/61 |
| | | | 718/1 |

* cited by examiner

*Primary Examiner* — Thomas J. Cleary
(74) *Attorney, Agent, or Firm* — Jackson Walker L.L.P.

(57) ABSTRACT

An information handling system may include a host system comprising a host basic input/output system (BIOS); a management controller configured to provide out-of-band management of the information handling system; and an information handling resource including a plurality of components. The management controller may be configured to: query the information handling resource for information regarding capabilities that are supported by individual ones of the components; and provide an application programming interface (API) configured to allow access to the capabilities.

9 Claims, 5 Drawing Sheets

```
"ResourceCollection" : {
    "anyOf" : [
        {
            "$ref:" : "http://redfish.dmtf.org/schemas/v1/odata-v4.json#/definitions/idRef"
        },
        {
            "additionalProperties" : false,
            "description" : "The collection of XXX resource instances. ",
            "properties" : {
                "Description" : {
                    "readonly" : true
                },
                "Members" : {
                    "description" : "The members of this collection. ",
                    "type" : "array"
                },
                "Members@odata.count" : {
                    "$ref" : "http://redfish.dmtf.org/schemas/v1/odata-v4.json#/definitions/count"
                }
                "Name" : {
                    "$ref" : "http://redfish.dmtf.org/schemas/v1/Resource.json#/definitions/Name",
                    "readonly" : true
                }
            },
            "required" : [
                "Members",
                "Members@odata.count",
                "@odata.id",
                "@odata.type",
                "Name"
            ],
            "type" : "object"
        }
    ],
    "perpetual" : false,      INDICATING THE PROPERTY OR ACTION IS NOT MODIFIABLE
    "deletable" : false,      ALL TIMES.
    "insertable" : true,
    "updatable" : true,
```

MANAGEMENT CONTROLLER AS BIOS

TECHNICAL FIELD

The present disclosure relates in general to information handling systems, and more particularly to methods and systems for collecting information about components of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some computing applications, an information handling system may include a hypervisor for hosting one or more virtual resources such as virtual machines (VMs). A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In other applications, an information handling system may be used in a "bare metal" configuration in which only one operating system is installed, and the hypervisor and virtual resources are not needed.

In either scenario, a network interface of the information handling system may comprise a smart network interface card or "SmartNIC" and/or a data processing unit (DPU), which may offer capabilities not found in traditional NICs. For purposes of this disclosure, the terms "SmartNIC" and "DPU" may be used interchangeably. Further, it should be noted that some embodiments may operate on devices other than SmartNICs. For example, graphics processing units (GPUs), infrastructure processing units (IPUs), and other types of accelerators and smart devices may benefit from the teachings of this disclosure. For the sake of clarity and concreteness, the SmartNIC example will be discussed in detail herein, but one of ordinary skill in the art with the benefit of this disclosure will understand its application to such other devices.

A SmartNIC may act as a system within a system, including its own Unified Extensible Firmware Interface Basic Input/Output System (UEFI BIOS), its own operating system (OS) such as ESXio or any other suitable OS, and/or its own management controller such as a SmartNIC baseboard management controller (BMC).

In some situations, a BIOS of a host system may perform a procedure known as collect system inventory on restart (CSIOR). This procedure involves determining what devices are present in an information handling system, and it may take place within the host UEFI environment using UEFI protocols. Although a SmartNIC as a whole may be detected by this procedure, its internal components (e.g., the SmartNIC BIOS, management controller, storage resources, processing resources, firmware resources, and/or other information handling resources) typically are not. This is because the SmartNIC may not implement the UEFI protocols used by the CSIOR process, and thus it may not allow for collection of information regarding its component resources.

Accordingly, embodiments of this disclosure may provide techniques to allow for enumeration and collection of information about the information handling resources that are included as components of a SmartNIC. Further, embodiments may also be applied to information handling resources other than SmartNICs.

It is to be noted that various elements discussed herein are described in the Redfish® Specification 1.15, released Jan. 18, 2022 (hereinafter, Redfish Specification), which is incorporated by reference in its entirety. One of ordinary skill in the art with the benefit of this disclosure will understand its applicability to other specifications (e.g., prior or successor versions of the Redfish Specification). Further, some embodiments may be applicable to different technologies other than Redfish.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with collection of information about SmartNIC components may be reduced or eliminated.

In accordance with embodiments of the present disclosure, an information handling system may include a host system comprising a host basic input/output system (BIOS); a management controller configured to provide out-of-band management of the information handling system; and an information handling resource including a plurality of components. The management controller may be configured to: query the information handling resource for information regarding capabilities that are supported by individual ones of the components; and provide an application programming interface (API) configured to allow access to the capabilities.

In accordance with these and other embodiments of the present disclosure, a method may include, in an information handling system including a host system comprising a host basic input/output system (BIOS), a management controller configured to provide out-of-band management of the information handling system, and an information handling resource including a plurality of components: the management controller querying the information handling resource for information regarding capabilities that are supported by individual ones of the components; and the management controller providing an application programming interface (API) configured to allow access to the capabilities.

In accordance with these and other embodiments of the present disclosure, an article of manufacture may include a non-transitory, computer-readable medium having instructions thereon that are executable by at least one processor of a management controller of an information handling system that includes a host system comprising a host basic input/output system (BIOS) and an information handling resource including a plurality of components, the instructions being executable for: querying the information handling resource for information regarding capabilities that are supported by individual ones of the components; and providing an application programming interface (API) configured to allow access to the capabilities.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates an example listing, in accordance with embodiments of the present disclosure.

DETAILED DESCRIPTION

Figure 1:
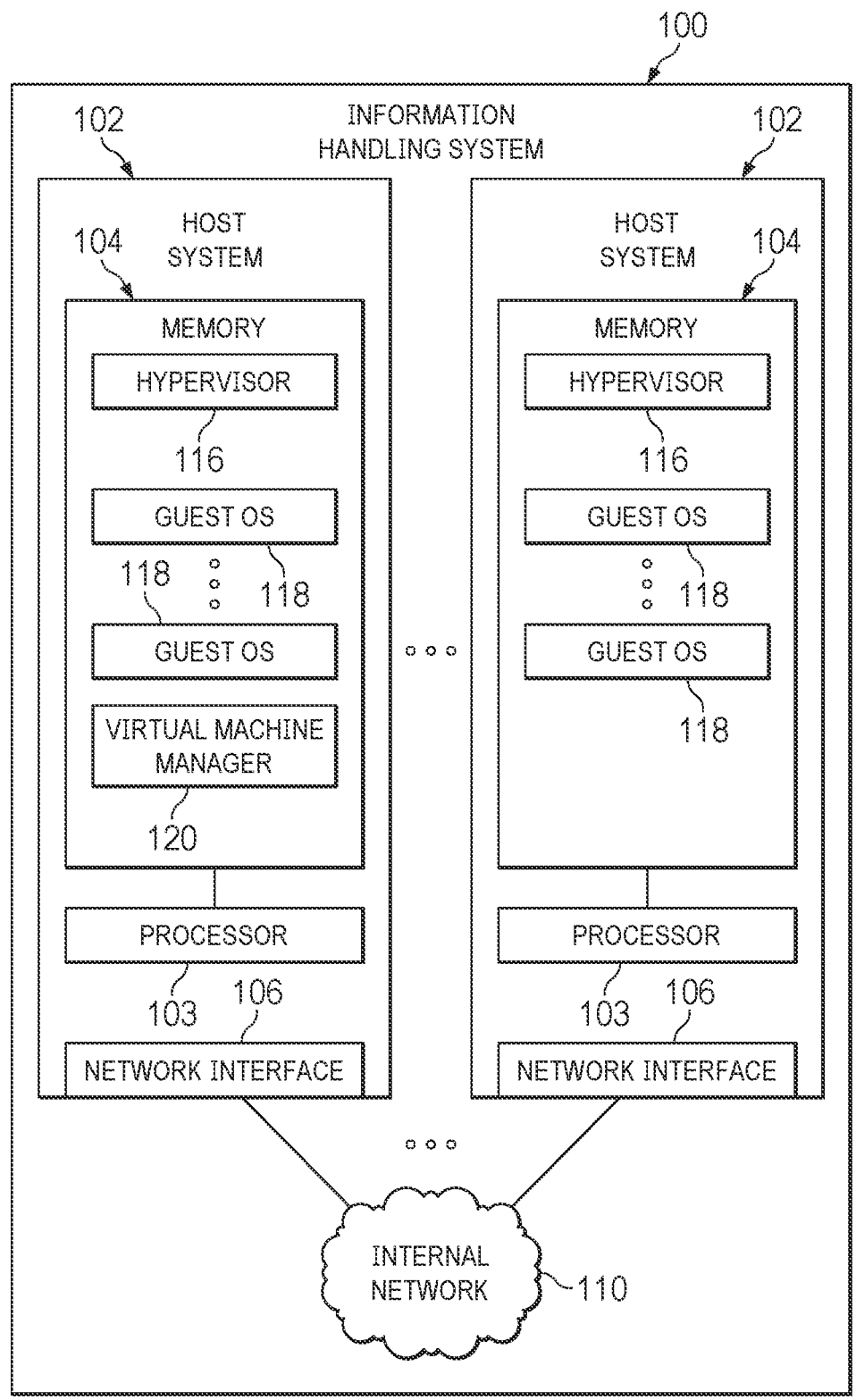
FIG. 1 illustrates a block diagram of selected components of an example information handling system, in accordance with embodiments of the present disclosure.

Preferred embodiments and their advantages are best understood by reference to FIGS. 1 through 5, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing. Physical computer-readable media such as disk drives, solid-state drives, non-volatile memory, etc. may also be referred to herein as "physical storage resources."

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network or an external network such as the Internet.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 100 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may comprise software and/or firmware generally operable to allow multiple virtual machines and/or operating systems to run on a single computing system (e.g., an information handling system 100) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 100 and internal network 110. A network interface 106 may enable its associated information handling system 100 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a SmartNIC and/or a DPU. In addition to the stateful and custom offloads a SmartNIC or DPU may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

As discussed above, embodiments of this disclosure may provide techniques for collecting information regarding internal information handling resources of a device such as a SmartNIC. Some embodiments may employ Redfish, which is a communications standard designed to deliver simple and secure management functionality that is supported by many management controllers. Other embodiments may use different communications standards, but the example of Redfish is discussed in detail herein for the sake of clarity and concreteness.

A host management controller may in some embodiments perform the CSIOR functionality that is traditionally carried out by the BIOS, collecting the current values and schemas for all of the SmartNIC hardware from the SmartNIC via Redfish. The SmartNIC may act as a Redfish client, as well as a content provider. As a Redfish client, the SmartNIC may retrieve pending values from the management controller, and as a content provider, the SmartNIC may push current values to the management controller.

Some embodiments may provide a generic infrastructure to allow devices to provision themselves via Redfish. The Redfish-based device provisioning may be implemented via special handling in the Redfish service, as described herein.

Figure 2:
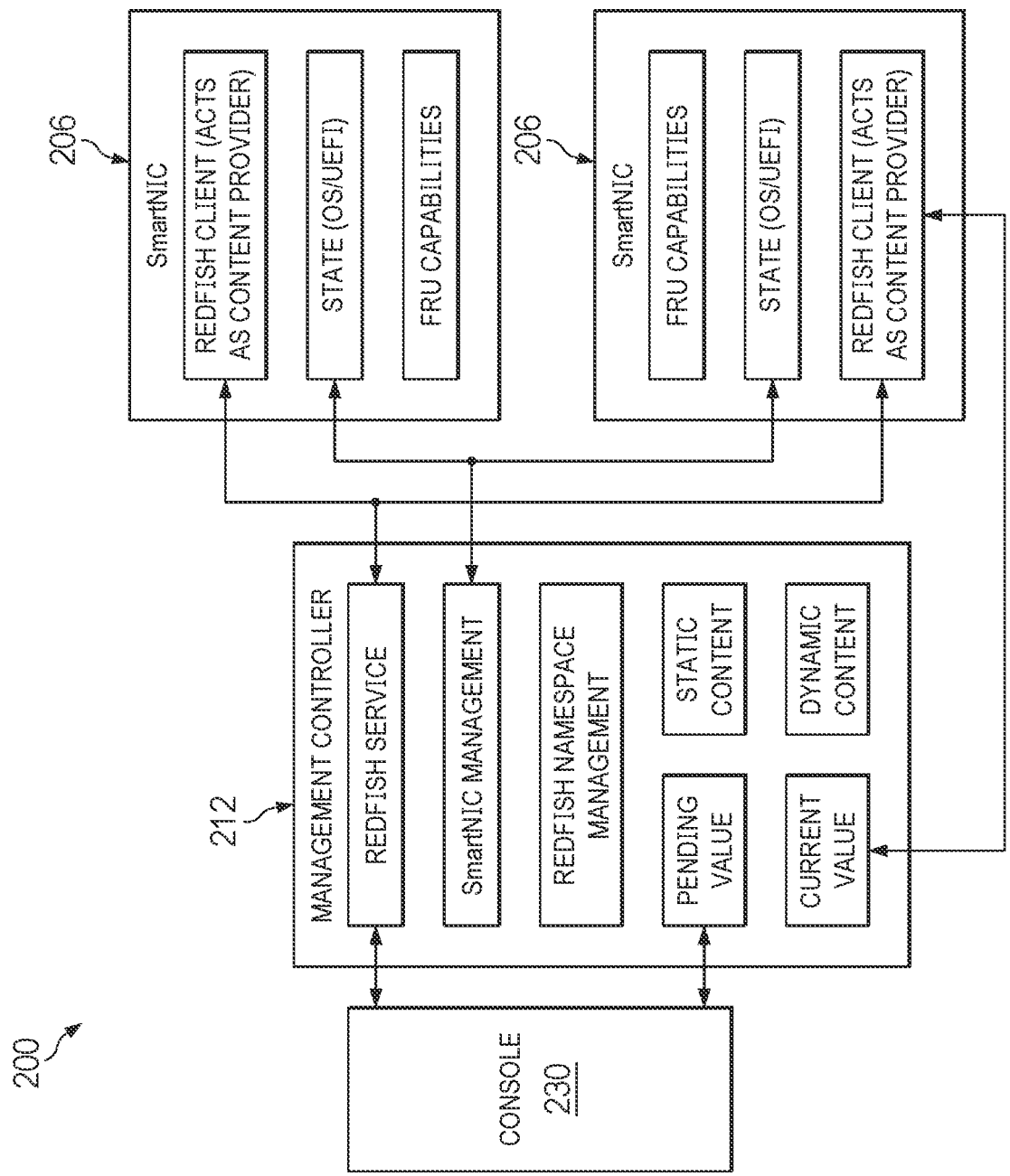
FIG. 2 illustrates a block diagram of selected components of an example information handling system, in accordance with embodiments of the present disclosure.

Turning now to FIG. 2, a block diagram of selected components of an information handling system 200 is shown, according to some embodiments. Information handling system 200 may include a host system (not shown), management controller 212, and one or more SmartNICs 206. The host system may be coupled to the hardware of SmartNICs 206 via a communication channel (not shown) such as Peripheral Component Interconnect Express (PCIe) in some embodiments. SmartNICs 206 may include various internal information handling resources (not shown separately).

Management controller 212 may be coupled to SmartNICs 206 via a network controller sideband interface (NC-SI), which may be established over reduced media-independent interface (RMII) based transport (RBT), over PCIe vendor-defined message (VDM), over SMBus, etc. Further, information handling system 200 may be remotely managed by a user via console 230.

Information handling system 200 may include various other information handling resources (not shown separately) besides SmartNICs 206 and their internal components. The information handling resources of information handling system 200 (including the internal information handling resources of SmartNICs 206) may have various capabilities, which can vary from device to device, as well as with different versions and manufacturers. Redfish operations (e.g., GET, POST, PUT, PATCH, etc.) may be derived from these capabilities and may remain associated with a device for as long as it is physically attached and meets any other designated criteria (e.g., licensing and/or privilege criteria). These operations may be accessible via associated Redfish uniform resource identifiers (URIs), as one of ordinary skill in the art with the benefit of this disclosure will appreciate.

Various difficulties may arise, however. For example, in the Redfish schema model, a SmartNIC may be modeled as a System on Chip (SoC)/System. Due to inherent differences between the various vendors of SmartNICs, a static namespace of the device capabilities can result in compatibility issues. That is, although devices may belong to the same class (e.g., the DPU class, the SmartNIC class, etc.), the capabilities that any particular such device supports can depend on its vendor, hardware version, firmware image, etc. Enabling all possible device inventory or configuration URIs irrespective of the device details can result in generic scripts failing (e.g., because of a lack of support in firmware or hardware for a particular capability needed by the script), adding to overhead and requiring vendor-specific scripts.

Further, associating capabilities with a device indefinitely can in some situations be undesirable. Accordingly, embodiments may allow for capabilities to be associated with a device only during specific device states and/or specific times. For example, a SmartNIC UEFI may be allowed to update the Secure Boot certificates and other BIOS configuration information during the UEFI boot phase, but once the SmartNIC OS has loaded, it may be prevented from modifying these settings.

Accordingly, embodiments of this disclosure may provide a mechanism for customizing the enablement of various Redfish copy-read-update-delete application programming interfaces (CRUD APIs), which may be vendor-specific, state-specific, and/or time-specific. For example, a device might have multiple firmware images which might be loaded for implementing various aspects of its behavior. Accordingly, embodiments may operate to ensure that the correct device capabilities are exposed when the device has booted into a particular firmware (e.g., based on its current state), suppressing capabilities that are not appropriate for that situation.

Further, in order to be compliant with the Redfish Specification, a generic standard Redfish URI may be used by console 230 and the SmartNIC UEFI/OS, but servicing the URI may be polymorphic in nature so as to differentiate the user, device, and service accordingly.

Still further, a device may in some embodiments be allowed to configure only its own device URIs with full access (e.g., device-specific URIs only). This may entail a new level of abstraction.

In one embodiment, dynamic namespaces may be used such that devices connected to information handling system 200 may each generate a list of properties and actions that can be performed. Additional details of device capabilities may be periodically transmitted to management controller 212, based on each device's situation and responsibilities. In some embodiments, the namespace may incorporate both static and dynamic elements, such that the dynamic elements may be changed but the static elements remain constant.

FIG. 3 provides an example listing 300 of elements of a dynamic namespace, according to one embodiment.

The device capabilities shared by the device may ensure availability of the resource/property (e.g., via a GET API) for a defined period such as during the duration of a boot sequence. Further, the capabilities may allow manipulation (e.g., via a PATCH, POST, and/or PUT API) of settings or device functionality during a particular period or state, as defined by the device.

Device-specific client URIs may be generated for use by management controller 212, based on the supported operations that have been declared in device schema and the current capabilities that a device supports. When queried, the exposed URIs may then either return success or failure based on the timing of the request (e.g., based on whether the request occurs during a time or a device state that supports that request).

Figure 4:
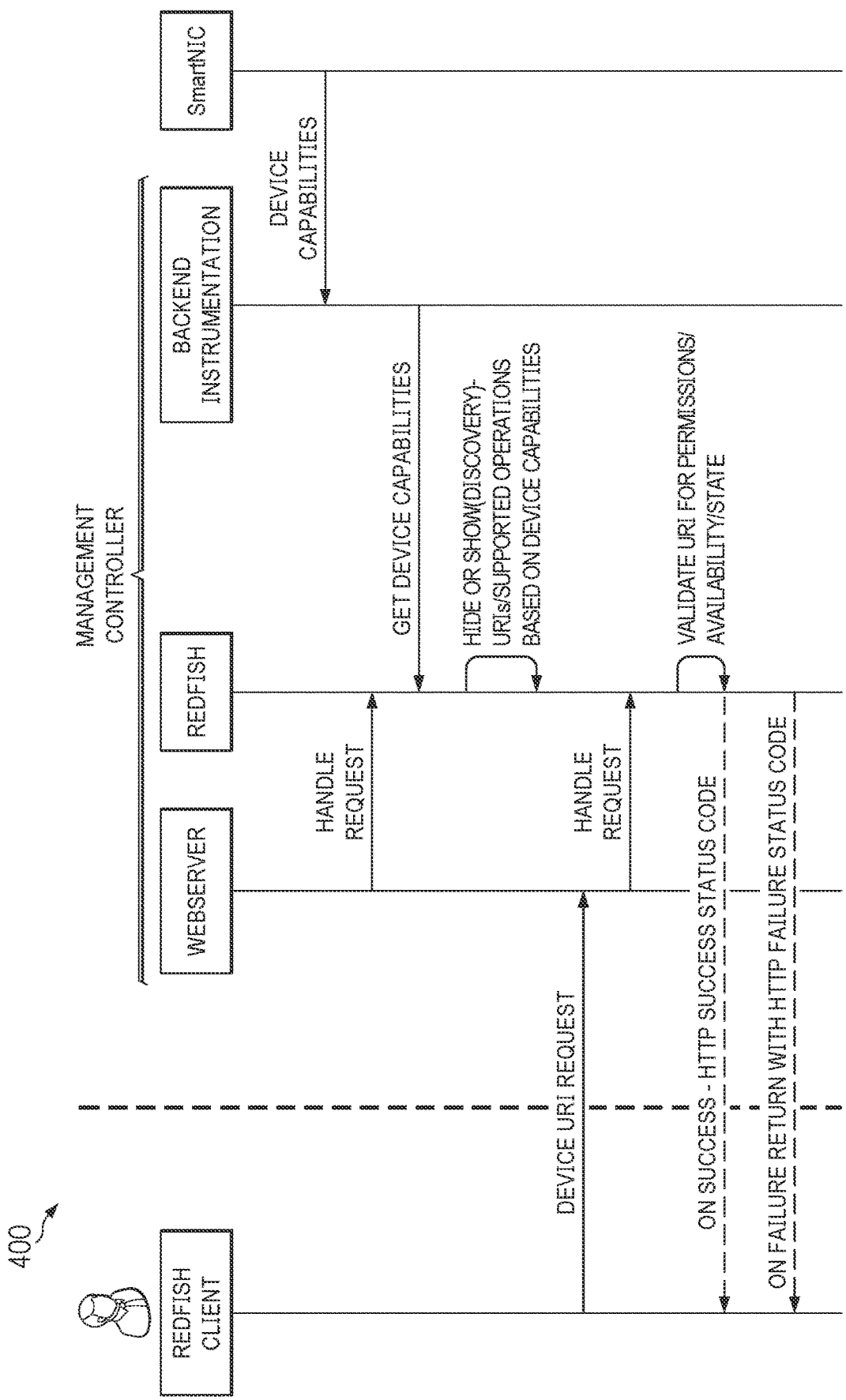
FIGS. 4 and 5 illustrate an example sequence diagrams, in accordance with embodiments of the present disclosure.

Turning now to FIG. 4, a sequence diagram flow chart is shown of an example method 400 for the use of a polymorphic Redfish URI, in accordance with some embodiments. This embodiment provides a mechanism to generate a dynamic namespace, which may enable resource capabilities based on device discovery. Hardware capabilities, vendor details, and firmware support may be among the factors considered in either enabling or disabling a device's support for a given CRUD operation.

PCIe devices may, upon device discovery during boot, share information regarding properties such as vendor ID, firmware image information, hardware details, etc. Such details may be obtained via a secure key exchange mechanism established between a management controller such as management controller 212 and each respective device. The shared details may then be mapped to device identities and Redfish resource URIs.

A capability table or other suitable data structure may store the details and may be updated from time to time (e.g., periodically) to reflect changes in hardware or firmware capabilities. With discovery-based URI modeling, the supported URIs for each device may be populated based on the capability bits that are set in the capability table. Device capabilities may also transform into methods (e.g., GET, POST, PATCH, and/or PUT methods) supported for the particular device in a polymorphic manner.

Figure 5:
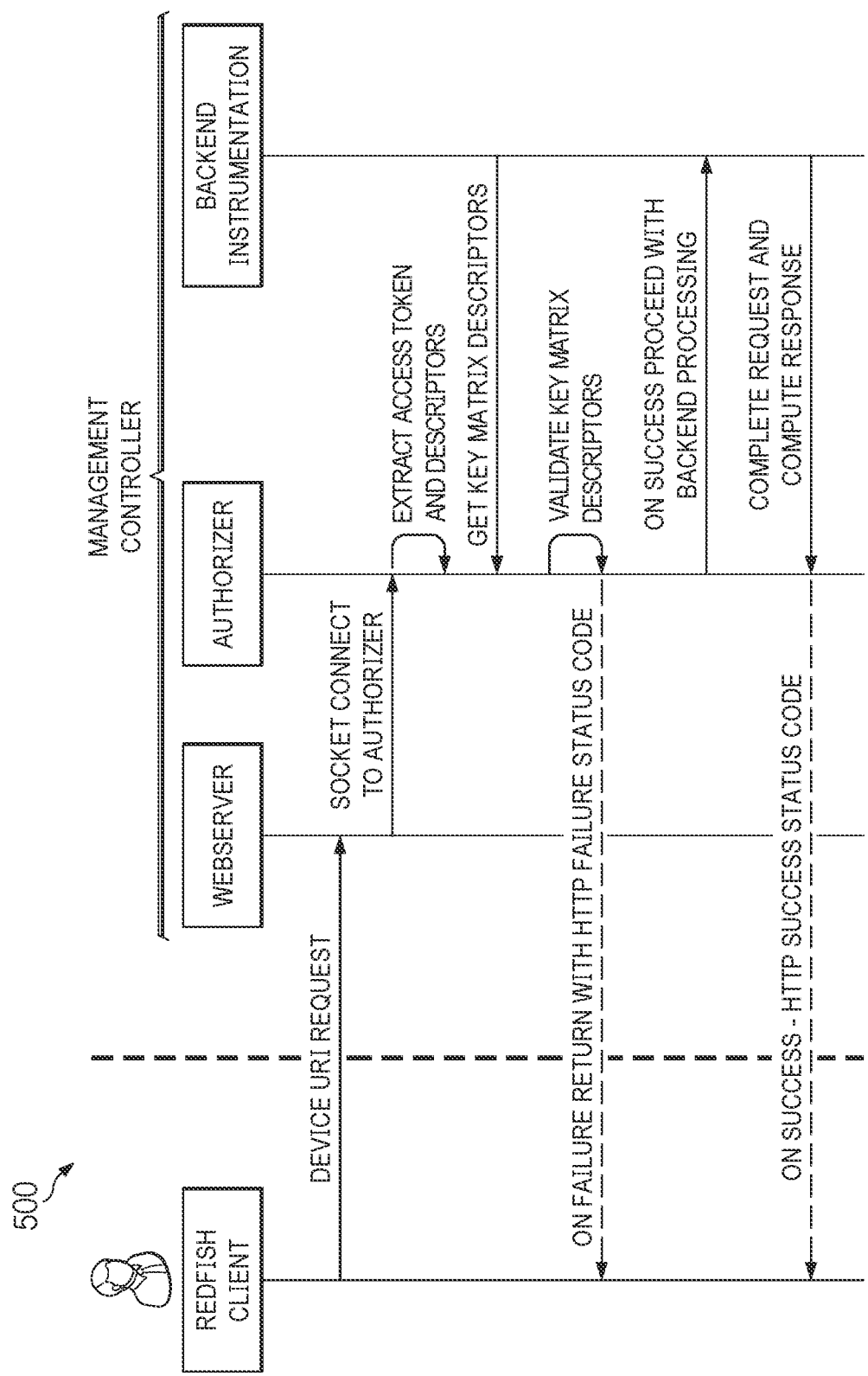

Turning now to FIG. 5, a sequence diagram flow chart is shown of an example method 500 relying on a request origin, in accordance with some embodiments.

A Redfish client may make a request according to a Redfish API to a management controller using a retrieved access token, which may be based on an HTTP/HTTPS authorization request header. An authorizer executing within the management controller may intercept the request, extract the token, and validate it.

Upon successful validation, key items of information from the token such as a username, credentials, license, privileges, device descriptor, source of origin, etc. may be captured by the management controller.

Certain key identity matrix descriptors such as the fully qualified device descriptor (FQDD), the source of network origin, etc. may further be checked against the secured details of the device which were used during the creation of access token. Any mismatch in the descriptors may cause the connection to be treated as invalid, thereby preventing access.

In other scenarios, a request from a device-specific Redfish client accessing other management controller resources may also be contained through URI segment validation and source of origin checks, along with the FQDD check.

Table 1 below provides some examples of request origin, interface name mapping, and authentication method.

TABLE 1

| Request Origin | Interface Name Mapping | Authentication Method |
|---|---|---|
| Host OS | USB pass-through (usbpt) | New temporary bootstrap account |
| External | usbpt | Existing method |
| SmartNIC | sd0, sd1 | New SmartNIC OAuth |
| External | sd0, sd1 | Other than new SmartNIC OAuth |
| External | bond0, bond0.* | Existing method |
| Invalid | All other combinations, e.g.: 1. usbpt & New SmartNIC OAuth 2. sd0, sd1 & New temporary bootstrap account 3. bond0, bond0.* & New SmartNIC OAuth 4. bond0, bond0.* New temporary bootstrap account | |

One of ordinary skill in the art with the benefit of this disclosure will understand that the preferred initialization point for the methods depicted in FIGS. 4 and 5 and the order of the steps comprising those methods may depend on the implementation chosen. In these and other embodiments, this methods may be implemented as hardware, firmware, software, applications, functions, libraries, or other instructions. Further, although FIGS. 4 and 5 disclose a particular number of steps to be taken with respect to the disclosed methods, the methods may be executed with greater or fewer steps than depicted. The methods may be implemented using any of the various components disclosed herein, and/or any other system operable to implement the method.

Accordingly, embodiments of this disclosure may provide various enhancements. A management controller may take on the role of a BIOS, performing CSIOR for collecting the current values and schemas from sideband devices like SmartNICs and their internal components. Such devices may act as a Redfish client as well as a content provider.

Embodiments may provide infrastructure to enable a common platform for any smart devices to provision themselves via Redfish. This may be implemented via dynamic Redfish namespace access based on device capabilities and states in one embodiment. In another embodiment, it may be implemented via a polymorphic Redfish service provider based on the origin of the Redfish request. In yet another embodiment, the management controller may provide provisioned secure access to the SmartNIC to configure only its own device-specific URIs (e.g., not providing access to any other devices).

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
  a host system comprising a host basic input/output system (BIOS);
  a management controller configured to provide out-of-band management of the information handling system; and
  an information handling resource including a plurality of components, wherein the information handling resource is a SmartNIC, and wherein the components include at least one component selected from the group consisting of a SmartNIC BIOS and a SmartNIC management controller;
  wherein the management controller is configured to:
    query the information handling resource for information regarding capabilities that are supported by individual ones of the components, wherein the host BIOS is not capable of querying the information handling resource for the information; and
    provide an application programming interface (API) configured to allow access to the capabilities.

2. The information handling system of claim 1, wherein the API is a Redfish API.

3. The information handling system of claim 1, wherein the information regarding the capabilities indicates at least one time-specific capability or at least one state-specific capability.

4. A method comprising, in an information handling system including a host system comprising a host basic input/output system (BIOS), a management controller configured to provide out-of-band management of the information handling system, and an information handling resource including a plurality of components:
  the management controller querying the information handling resource for information regarding capabilities that are supported by individual ones of the components, wherein the host BIOS is not capable of querying the information handling resource for the information, wherein the information handling resource is a SmartNIC, and wherein the components include at least one component selected from the group consisting of a SmartNIC BIOS and a SmartNIC management controller; and
  the management controller providing an application programming interface (API) configured to allow access to the capabilities.

5. The method of claim 4, wherein the API is a Redfish API.

6. The method of claim 4, wherein the information regarding the capabilities indicates at least one time-specific capability or at least one state-specific capability.

7. An article of manufacture comprising a non-transitory, computer-readable medium having instructions thereon that are executable by at least one processor of a management controller of an information handling system that includes a host system comprising a host basic input/output system (BIOS) and an information handling resource including a plurality of components, the instructions being executable for:
  querying the information handling resource for information regarding capabilities that are supported by individual ones of the components, wherein the host BIOS is not capable of querying the information handling resource for the information, wherein the information handling resource is a SmartNIC, and wherein the components include at least one component selected from the group consisting of a SmartNIC BIOS and a SmartNIC management controller; and
  providing an application programming interface (API) configured to allow access to the capabilities.

8. The article of claim 7, wherein the API is a Redfish API.

9. The article of claim 7, wherein the information regarding the capabilities indicates at least one time-specific capability or at least one state-specific capability.

* * * * *